No. 636,406. Patented Nov. 7, 1899.
F. M. HOWE.
SWITCH STICK OR BAR.
(Application filed July 7, 1899.)
(No Model.)
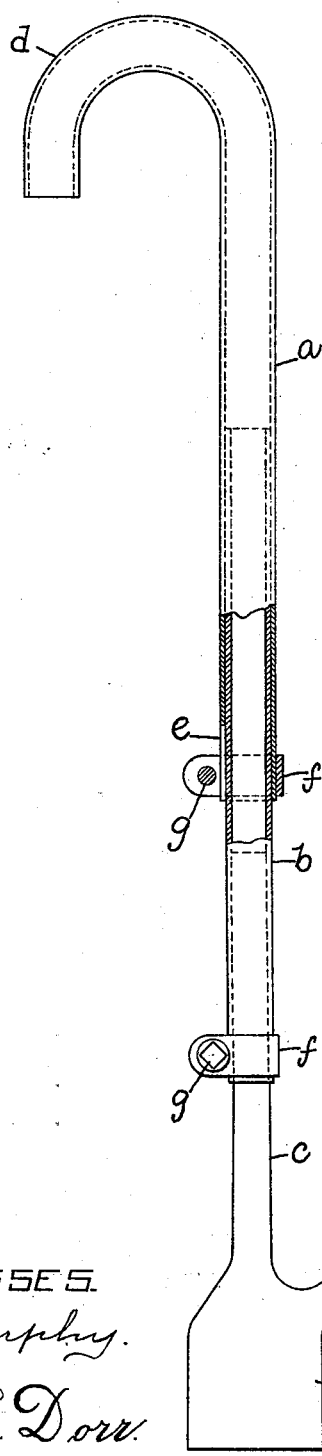
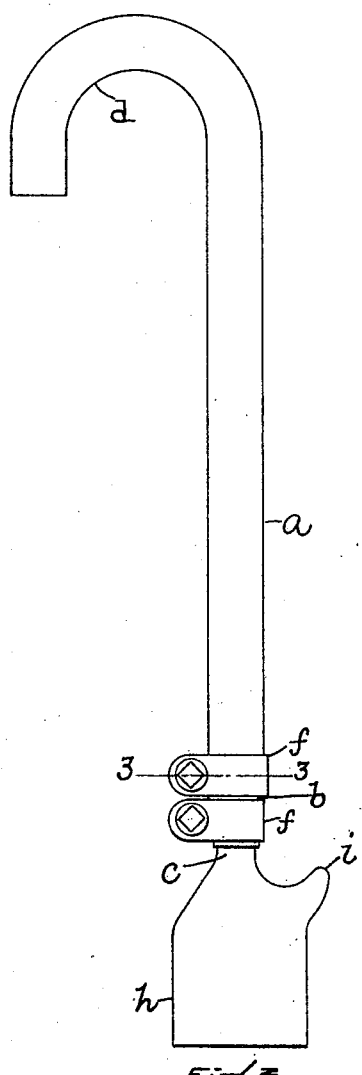
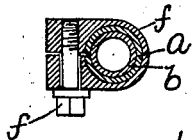
WITNESSES.
J. Murphy.
Fred E. Dorr.
INVENTOR.
Frank M. Howe
by Jas. H. Churchill
atty.

UNITED STATES PATENT OFFICE.

FRANK M. HOWE, OF LAWRENCE, MASSACHUSETTS.

SWITCH STICK OR BAR.

SPECIFICATION forming part of Letters Patent No. 636,406, dated November 7, 1899.

Application filed July 7, 1899. Serial No. 723,013. (No model.)

*To all whom it may concern:*

Be it known that I, FRANK M. HOWE, a citizen of the United States, residing in Lawrence, in the county of Essex and State of Massachusetts, have invented an Improvement in Switch Sticks or Bars, of which the following description, in connection with the accompanying drawings, is a specification, like letters on the drawings representing like parts.

This invention relates to a switch-bar of the class commonly employed by motormen on electric street-railway cars for turning the track-switches from the platform of the car. Switch-bars as now commonly constructed are made of a single piece, usually of wood, and provided with a steel end piece. These bars as now constructed are objectionable in that they are unsightly and inconvenient to carry and are not suitable for use on cars having platforms different distances above the ground. The platforms of open cars are higher from the ground than those of box or closed cars, and a switch stick or bar which is suitable for use on one class of cars is not suitable or convenient for use on the other.

To overcome the objections to switch sticks or bars as now commonly made is the object of this invention, and for this purpose I have provided a switch stick or bar made in sections which are adjustable with relation to one another and are provided with means for securing the said sections in their adjusted positions. The sections of the switch stick or bar are preferably made telescopic and provided with clamping devices, as will be described. These and other features of this invention will be pointed out in the claims at the end of this specification.

Figure 1 is an elevation, with parts broken out, of a switch stick or bar embodying this invention, the same being shown in its extended condition; Fig. 2, an elevation of the switch-bar shown in Fig. 1 with the parts in their closed or contracted position; and Fig. 3, a section on the line 3 3, Fig. 2.

The switch bar or stick herein shown comprises three sections $a\ b\ c$. The sections $a\ b$ are preferably made of metal tubes, with the tube $b$ fitted to slide into the tube $a$, which is preferably curved to form the handle $d$.

The tubes $a\ b$ are provided at one end, which may be termed the "outer" end, with longitudinal slits $e$, only one of which is shown in Fig. 1, and the said outer ends have brazed or otherwise fastened to them clamping-collars $f$, having projecting ends through which are extended the binding-screws $g$, by which the tubes or sections $b\ c$ may be firmly secured in their adjusted positions. The section $c$ is represented as a rod provided at its outer end with a blade $h$, having a hook $i$, which latter is adapted to engage the car-fenders on the cars to move the same.

The sectional switch bar or stick above described is capable of being readily adjusted by the motorman so as to reach the track-switch from the platforms of cars whose platforms vary in height above the track, and when not in use it can be shut up or contracted into the position shown in Fig. 2, in which position it is convenient to carry when the motorman is off the car and is sightly. The sections of the switch stick or bar are firmly secured in their adjusted positions, so as to render the sectional stick or bar solid in order to throw the switch and avoid turning of one section within the other.

I claim—

1. A switch bar or stick comprising sections adjustable with relation to one another to lengthen and shorten the same, one end section having a bent handle, and the other end section having a blade, and means to firmly secure said sections in their adjusted position, substantially as described.

2. A switch bar or stick comprising telescopic sections, one of which is provided with a blade, and the others of which are hollow and split longitudinally at their ends, clamping-collars firmly attached to the split ends of the hollow sections, and means to engage said clamping-collars to secure said sections in their adjusted position, substantially as described.

3. A switch bar or stick comprising a tubular section $a$ having a curved handle at one end and split longitudinally at its other end, a clamping-collar secured to said split end of said section, a tubular section $b$ fitted to slide into the section $a$ and split longitudinally at its outer end, a clamping-collar on said split end, and a section $c$ fitted to slide in the section $b$ and provided at its end with the blade $h$, and means to engage said clamping-collars to secure the sections $b$, $c$, in their adjusted positions, substantially as described.

In testimony whereof I have signed my name to this specification in the presence of two subscribing witnesses.

FRANK M. HOWE.

Witnesses:
FRED W. HOWE,
WILBUR E. ROWELL.